(12) United States Patent
Sonoda

(10) Patent No.: US 8,139,132 B2
(45) Date of Patent: Mar. 20, 2012

(54) SOLID-STATE IMAGING APPARATUS AND DRIVING METHOD FOR SOLID-STATE IMAGING APPARATUS

(75) Inventor: Kazuhiro Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 12/403,449

(22) Filed: Mar. 13, 2009

(65) Prior Publication Data

US 2009/0244332 A1    Oct. 1, 2009

(30) Foreign Application Priority Data

Mar. 31, 2008   (JP) ................................ 2008-091555

(51) Int. Cl.
*H04N 3/14* (2006.01)
*H04N 5/335* (2011.01)

(52) U.S. Cl. ...................................... 348/302; 348/294

(58) Field of Classification Search .................... 348/302
See application file for complete search history.

(56) References Cited

U.S. PATENT DOCUMENTS

| | | | |
|---|---|---|---|
| 7,479,916 B1 * | 1/2009 | Reshef et al. ................. | 341/169 |
| 2002/0154347 A1 | 10/2002 | Funakoshi et al. ............ | 358/513 |
| 2005/0174452 A1 * | 8/2005 | Blerkom et al. ............... | 348/294 |
| 2007/0046795 A1 * | 3/2007 | Yamashita ..................... | 348/294 |
| 2008/0225145 A1 | 9/2008 | Sonoda .......................... | 348/294 |
| 2008/0291290 A1 | 11/2008 | Sonoda et al. ............. | 348/222.1 |
| 2009/0244328 A1 * | 10/2009 | Yamashita ..................... | 348/241 |

FOREIGN PATENT DOCUMENTS

| | | |
|---|---|---|
| JP | 2002-320235 A | 10/2002 |
| JP | 2006-025189 A | 1/2006 |
| JP | 2007-336374 A | 12/2007 |

* cited by examiner

*Primary Examiner* — Lin Ye
*Assistant Examiner* — Chia-Wei A Chen
(74) *Attorney, Agent, or Firm* — Fitzpatrick, Cella, Harper & Scinto

(57) ABSTRACT

When a solid-state imaging apparatus which has A/D conversion circuits in every column and subjects a digitized signal to arithmetic processing carries out a horizontal skipping operation and calculates respective signals held in a plurality of register circuits, an A/D converter and a register circuit in a column which is skipped, specifically, is not read out, do not participate in the operation, so that the circuit has been susceptible to investigation in terms of use efficiency. The solid-state imaging apparatus has a unit for connecting a register circuit in a certain column with a register circuit in a different column.

10 Claims, 11 Drawing Sheets

SOLID-STATE IMAGING APPARATUS AND DRIVING METHOD FOR SOLID-STATE IMAGING APPARATUS

BACKGROUND OF THE INVENTION

1. Field of the Invention

The present invention relates to a solid-state imaging apparatus, and particularly relates to a solid-state imaging apparatus having an A/D converting circuit provided in each of columns and subjecting a plurality of obtained digital signals to arithmetic processing, and a method for driving a solid-state imaging apparatus.

2. Description of the Related Art

The so-called horizontal skipped reading (hereinafter regarded as the same meaning as horizontal skipping operation) has been known in a conventional solid-state imaging apparatus. In the horizontal skipped reading, for example, an analog electric signal, obtained by converting an incident light in each pixel, is read out in every other column of the pixels arranged in a matrix in a use of requiring a high speed operation, such as in a moving image.

In addition, a method is disclosed in Japanese Patent Application Laid-Open No. 2006-025189, which installs an A/D converting circuit in each column of pixels, and subjects the digitized signal to arithmetic processing. Specifically, the patent describes an image sensor which has two register circuits provided per pixel column to store two different signal levels from the same pixel into the register circuits and calculates a difference between both of the signal levels in a digital region.

When a horizontal skipping operation is performed and operations are performed on the basis of the signals held in the plurality of respective register circuits in the circuit configuration disclosed in the aforesaid Japanese Patent Application Laid-Open No. 2006-025189, the AD converters and register circuits in the skipped, that is, not read out, columns become the state of not participating in the operations. In this point, the circuit is susceptible to investigation in terms of use efficiency.

SUMMARY OF THE INVENTION

In order to solve the above described problem, a solid-state imaging apparatus according to the present invention includes: a plurality of pixels arranged in a matrix, wherein each of the pixels converts an incident light into an analog electric signal, and outputs the analog electric signal; A/D converters arranged each corresponding to each column of the plurality of pixels, for converting the analog electric signal from the pixel into a digital signal and for outputting the digital signal from an output terminal of the A/D converter; register circuits each arranged corresponding to each column of the plurality of pixels, for receiving by an input terminal thereof the digital signal output from the output terminal of the A/D converter, and for holding the digital signal received; a connecting unit for connecting the output terminal of the A/D converter arranged correspondingly to one column of the pixels to the input terminal of the register circuit arranged correspondingly to the other column of the pixels, or for connecting the output terminal of the register circuit arranged correspondingly to one column of the pixels to the input terminal of the register circuit arranged correspondingly to the other column of the pixels; and color filters, each arranged correspondingly to each of the pixels.

The solid-state imaging apparatus according to the present invention can reduce the number of the register circuit which does not participate in the operation, even when carrying out a horizontal skipping operation and calculating by using a digital signal which is held in a plurality of register circuits, and can improve the use efficiency of the circuit.

Further features of the present invention will become apparent from the following description of exemplary embodiments with reference to the attached drawings.

DESCRIPTION OF THE EMBODIMENTS

Exemplary embodiments according to the present invention will now be described below.

(Exemplary Embodiment 1)

Firstly, a circuit structure of a solid-state imaging apparatus according to one exemplary embodiment of the present invention will be described below. Next, in a horizontal skipping operation, an operation will now be described which subjects a plurality of digital signals based on pixels in different rows of the same column to arithmetic processing, by transferring a digital signal which has been held by a register circuit in a column to be read out, to a register circuit in a column which is not to be read out.

Figure 1:
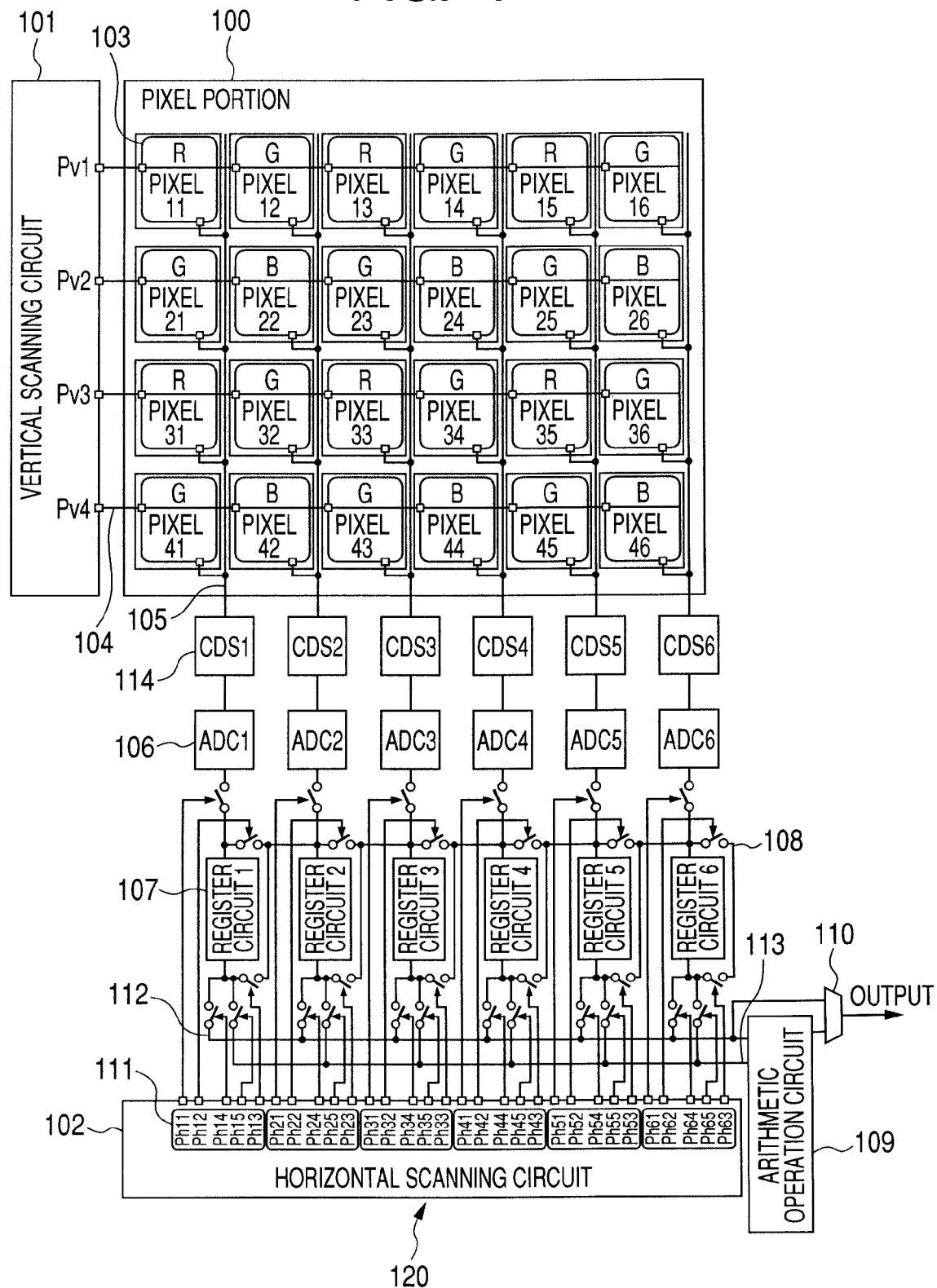
FIG. 1 is a block diagram of a solid-state imaging apparatus according to a first embodiment of the present invention.

FIG. 1 is a block diagram illustrating a solid-state imaging apparatus according to one embodiment of the present invention. In a pixel portion 100, pixels 103 each of which includes a photoelectric conversion element for converting incident light into an electric charge and outputs the electric charge as an analog electric signal are arranged in a matrix of arranging 6 pixels in a horizontal direction and 4 pixels in a vertical direction. R, G and B which are attached in each of pixels represent colors of color filters which are provided correspondingly in respective pixels, and represent Red, Green and Blue respectively. A pixel which has the color filter of the C color (C is any one of R, G and B) is referred to as a C pixel hereafter. Pixels 103 constituting one row are commonly connected to a vertical scanning circuit 101 by a row selection line 104, and 6 pixels which are connected by the selected row selection line 104 are simultaneously selected. Pixels in a range of a first row to a fourth row are sequentially selected by setting a row selection signal at a high level sequentially from Pv1 to Pv4.

An analog electric signal to be output from pixels in a row which has been selected by the row selection line 104 is input to a CDS (Correlated Double Sampling) circuit 114 which has been provided in every column through a vertical output line 105 which commonly connects pixels in one column. The CDS circuit 114 cancels a noise by subjecting a noise level included in an analog electric signal and a signal level to difference processing. In FIG. 1, the vertical output line 105 is directly connected to the CDS circuit, but an amplifier which amplifies an analog electric signal sent from pixels may be placed between the pixel portion 100 and the CDS 114 and be connected with them so as to reduce an influence of a noise component which is superimposed on the analog electric signal. The analog electric signal in each column, in which the noise has been canceled, is input into an A/D converter (ADC) 106 which is provided in every one column. The analog electric signal which has been input into the ADC 106 is converted into a digital signal. The digital signal is output from the output terminal of the A/D converter, and a register circuit 107 which has been provided in every column of the pixels receives the digital signal in its input terminal and holds the digital signal therein.

A horizontal scanning circuit 102 selects the register circuit 107, and makes the register circuit 107 output the digital signal held therein to a horizontal output line through the output terminal of the register circuit 107. For instance, when the horizontal scanning circuit 102 transfers a column selection signal to a high level in the order of Ph14, Ph24 and so on, the digital signal which has been held in each register circuit is sequentially output to a horizontal output line 112 from the register circuits 1 to 6. The digital signal which has been output to the horizontal output line 112 is output through a selector 110.

In addition, the horizontal scanning circuit 102 makes each of register circuits 1 to 6 sequentially output a digital signal which has been held therein to a horizontal output line 113, by setting the column select signal at a high level in the order of Ph15, Ph25 and so on. When the digital signals are output to the horizontal output lines 112 and 113 simultaneously, an arithmetic operation circuit 109 to which the horizontal output lines 112 and 113 are connected in parallel subjects both of the digital signals to arithmetic processing such as addition, subtraction and averaging for both of the digital signals, and outputs the calculated result through the selector 110. Here, two horizontal output lines are connected to an arithmetic operation circuit 109, but the arithmetic operation circuit 109 may have such a structure as to be connected with three or more horizontal output lines, specifically, subject three or more digital signals to the arithmetic processing.

In the present embodiment, the selector 110 selects a signal which has been obtained by subjecting two digital signals read out through the horizontal output lines 112 and 113 to the arithmetic processing, and a digital signal which has been read out through the horizontal output line 112 and is not subjected to the arithmetic processing, and output the selected signal.

In the present embodiment, 6-pixel columns in a horizontal direction is divided into two blocks of each 3-pixel columns, but an effect of the present invention does not change even when the number of pixel columns per block is increased and the pixel portion is divided into three or more blocks.

Figure 2:
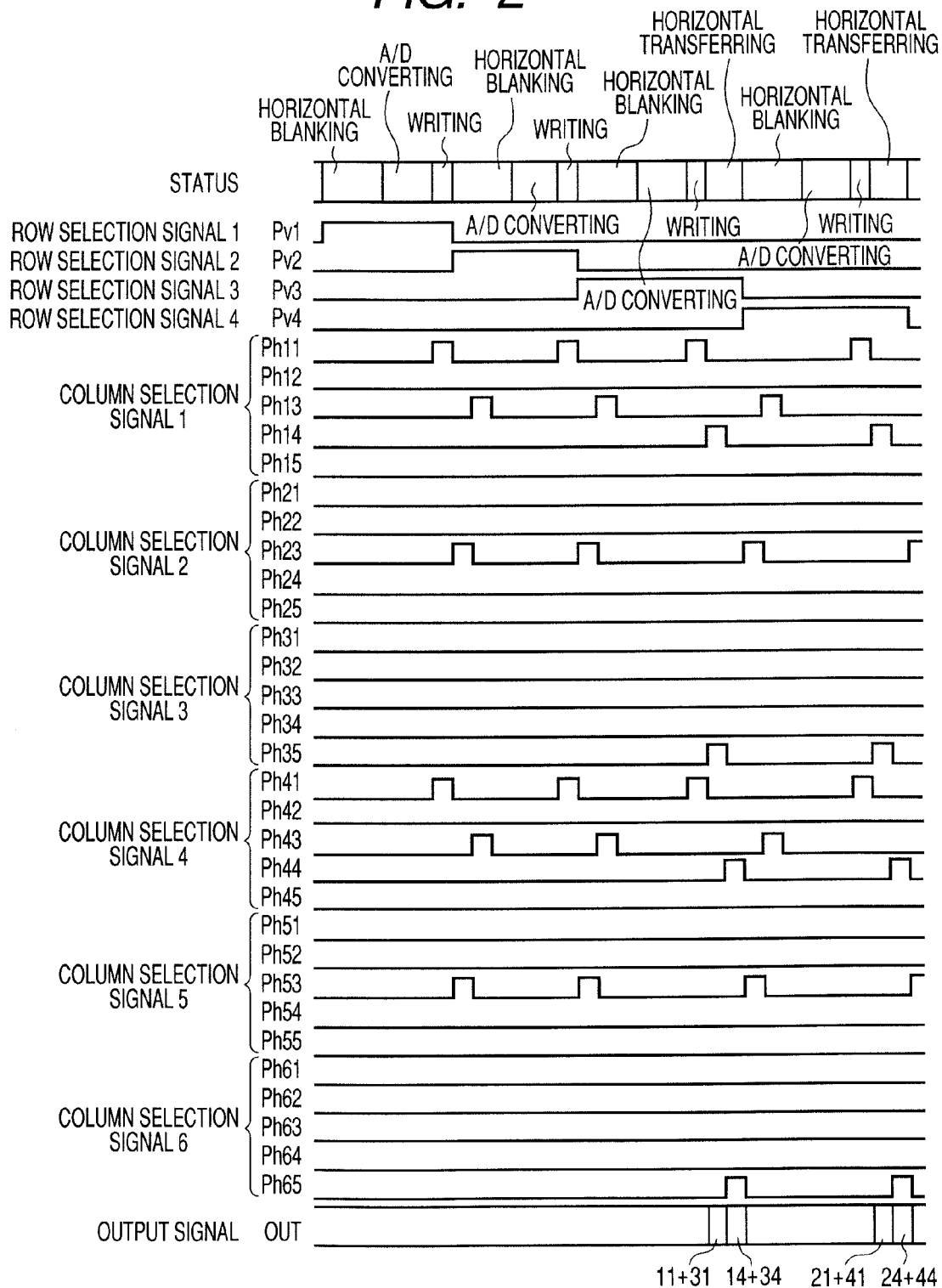
FIG. 2 is a timing chart illustrating a method for driving a solid-state imaging apparatus according to a first embodiment of the present invention.

A timing chart shown in FIG. 2 illustrates an operation for adding signals of 2 pixels in the same column while carrying out a horizontal skipping operation, in a solid-state imaging apparatus shown in FIG. 1. The operation will now be described below with reference to FIG. 2. Data which has been written in register circuits 1 to 6 is set at zero as an initial state.

Here, the operation will now be described below focusing on a pixel column which includes a pixel 11 to a pixel 41. In this column, an R pixel and a G pixel are alternately aligned. Firstly, a row selection signal Pv1 is set at a high level, and an operation in a period of reading out a first row starts. During the status of horizontal blanking, a pixel 11 of the R pixel outputs an analog electric signal to a CDS 1 through a vertical output line 105, and the CDS 1 cancels the noise. In an A/D conversion status, an ADC 1 converts the signal from which the noise has been canceled to a digital signal through A/D conversion processing, and outputs the digital signal. In a writing status, a column selection signal Ph11 is changed to a high level thereby connecting the ADC 1 with a register circuit 1, and the digital signal is written into the register circuit 1.

Subsequently, the row selection signal Pv1 is changed to a low level, and a row selection signal Pv2 is changed to a high level instead. Then, a read out operation for pixels in a second row starts. When paying attention to a first column from the left, the signal of a pixel 21 of the G pixel is read out. In a horizontal blanking status for a second row, a transfer operation to the register circuit 2 from the register circuit 1 is carried out while pixels in the second row are read out. Firstly, a column selection signal Ph23 is set at a high level, and a digital signal (which is 0 here) held in the register circuit 2 is transferred to a register circuit 3. Subsequently, a column selection signal Ph13 is set at a high level, and a digital signal which is based on the pixel 11 and has been held in the register circuit 1 is transferred to the register circuit 2.

The noise in an analog electric signal sent from the pixel 21 is canceled by the CDS 1 during the horizontal blanking status, is converted into a digital signal in an A/D conversion status, and is written into the register circuit 1 when the column selection signal Ph11 is changed to a high level in a writing status. After the writing to the register 1 is finished, the row selection signal Pv2 is set at a low level, and the operation in the second row is finished.

The operation in a third row starts when a row selection signal Pv3 is changed to a high level, and in the horizontal blanking status, a digital signal which has been held in the register circuit 2, specifically, a digital signal based on the pixel 11 is transferred to the register 3. Subsequently, when the column selection signal Ph13 has been changed to a high level, a digital signal held in the register circuit 1, specifically, a digital signal based on the pixel 21 is transferred to the register 2. At the same time in the horizontal blanking status for the third row, the analog electric signal sent from a pixel 31 of the R pixel is read out to the CDS 1 through the vertical output line 105, and the noise is canceled in the CDS 1. The analog electric signal from which the noise has been canceled is converted into a digital signal by an ADC 1 in an A/D conversion status. The digital signal is output and is written into the register circuit 1 in a writing status.

Subsequently, in a horizontal transfer status, column selection signals Ph14 and Ph35 are set at a high level, and signals held in the register circuits 1 and 3, specifically, digital signals based on the pixels 31 and 11 which are both R pixels are output to horizontal output lines 112 and 113 respectively. Two digital signals which have been input into an arithmetic operation circuit 109 in parallel are added in the arithmetic operation circuit 109, and the resultant signal is output through a selector 110. Here, the output signal in FIG. 2 schematically shows a signal output from the selector 110, and 11+31, for instance, shows that a sum of a digital signal based on the pixel 11 and a digital signal based on the pixel 31 is output.

An operation similar to that in the third row is repeated on a fourth row and later rows, and digital signals based on pixels in the same column are added every other row. Then, the sum is output. Such an addition of every other row can be employed when color filters having a repeated unit of two-by-two, for instance, in a Bayer array illustrated in FIG. 1 are provided on pixel portions, and when signals from pixels having the same color are added with each other. By the way, the term averaging means to add signals sent from a plurality of pixels and to multiply the sum by an inverse number of the number of the pixels, and accordingly can be treated synonymously with a term addition.

The operation was described in the above focusing on 3 columns in the left side among 6 pixels in a horizontal direction. The 3 columns in the right side are operated at the same timing as those in the left side, except that a timing of outputting digital signals held in the register circuits 4 and 6 to the horizontal output lines 112 and 113 in a horizontal transfer status is different from that in the left side. Here, an example was described in which signals based on pixels in a first column and a fourth column were converted in a structure in which the color filters were provided on the Bayer array. However, the description does not limit the example to a method of reading out signals from pixels in a column of every 2 columns, but the method may be arbitrarily changed according to the application. In addition, pixels in each row are controlled by a common row selection line Pvn (n is any one of 1 to 4) as is illustrated in FIG. 1, so that analog electric signals based on pixels in second, third, fifth and sixth columns are output to vertical output lines 105 even in a horizontal skipping operation. However, A/D converters in these columns do not convert analog electric signals, so that the analog electric signals are not read out as digital signals. In addition, the A/D converters in these columns may be set in a non-operating state by blocking a power source so as not to operate the A/D converters, or turning off the power source to be supplied to reduce the power consumption. It is considered to control the power source to be supplied with a timing control circuit unit which is a control unit that will be described later.

Figure 3:
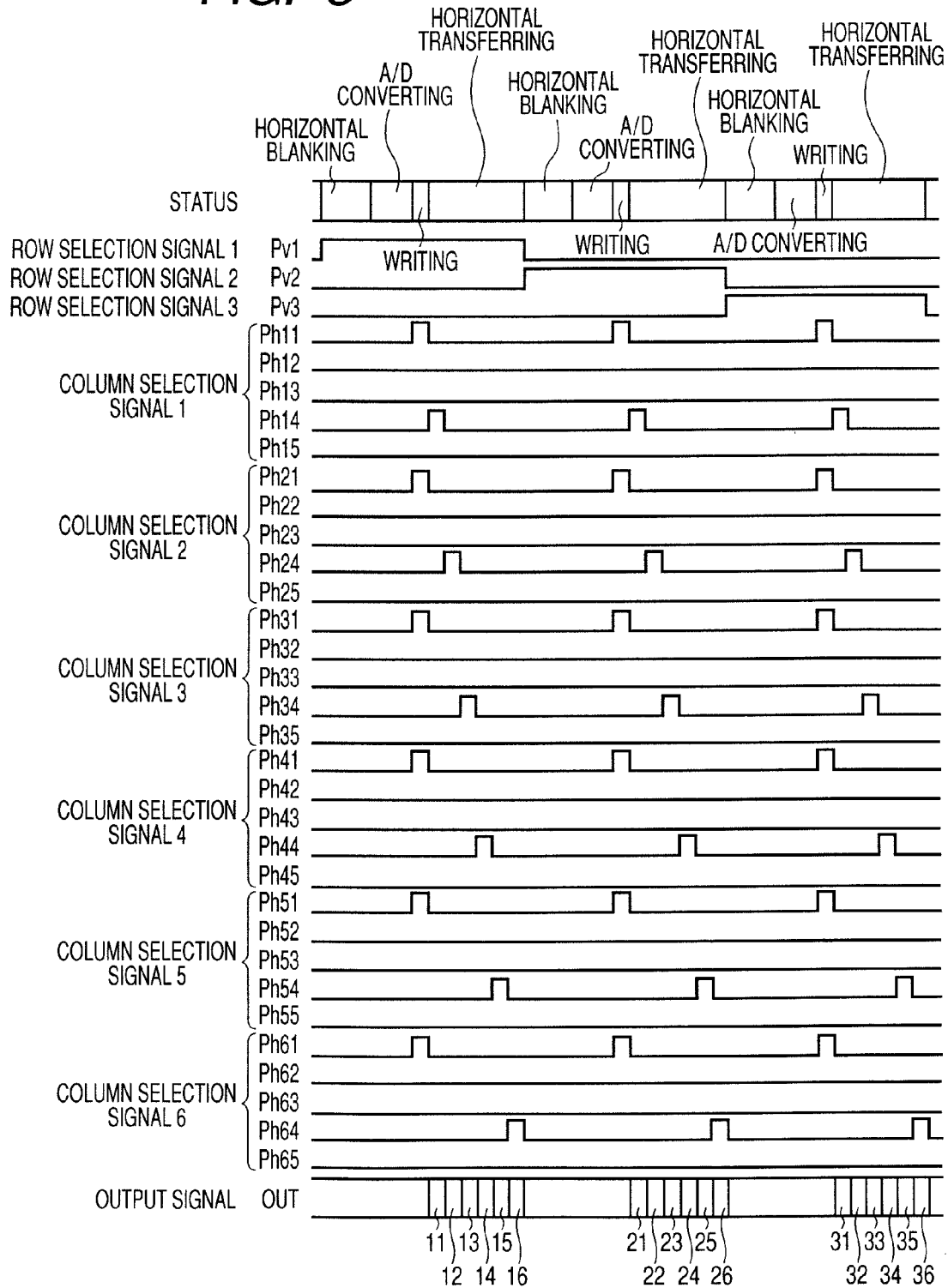
FIG. 3 is a timing chart illustrating a method for driving a solid-state imaging apparatus according to a first embodiment of the present invention.

Next, an operation to be carried out when outputting a signal without a skipping and addition operation in a method for driving a solid-state imaging apparatus illustrated in FIG. 1 will now be described below with reference to FIG. 3. This driving method is a driving method to be carried out when a high resolution is required as in still image photography or the like.

In the present driving method which reads out signals from all pixels, a horizontal transfer operation is carried out in a period of reading signals in each row. Firstly, in a horizontal blanking status and an A/D conversion status of a first row, a CDS cancels the noise of an analog electric signal sent from pixels in the first row, and an ADC outputs the signal as a digital signal of which the noise has been canceled.

In the next writing status, column selection signals Ph11, Ph21 and so on are simultaneously set at a high level, and a digital signal output from the ADC in each column is held in a register circuit in each column.

In the next horizontal transfer status, column selection signals Ph14, Ph24 and so on are simultaneously set at a high level, and a digital signal held in each register circuit is sequentially output to a horizontal output line 112. The digital signal which has been output to the horizontal output line 112 is output to the outside of the solid-state imaging apparatus through a selector 110.

By carrying out a similar operation for second row and subsequent rows, signals of all pixels can be sequentially output in a solid-state imaging apparatus illustrated in FIG. 1.

The solid-state imaging apparatus according to the above described embodiment of the present invention has a connecting unit which connects an output terminal of a register circuit with an input terminal of a register circuit which is provided in a column of pixels different from that of the previous register circuit. Accordingly, the solid-state imaging apparatus can reduce the number of a register circuit which is not involved in the operation compared to that of a conventional apparatus, when carrying out a horizontal skipping addition operation, and can enhance the use efficiency of the circuit. By the way, the term connecting unit used in the present exemplary embodiment refers to a path through which a pixel of nth column is brought into conduction when a column selection signal Phn3 is set at a high level, in FIG. 1. The solid-state imaging apparatus illustrated in FIG. 1 can read out signals of all pixels by driving the circuits as is illustrated in FIG. 3.

(Exemplary Embodiment 2)

Figure 4:
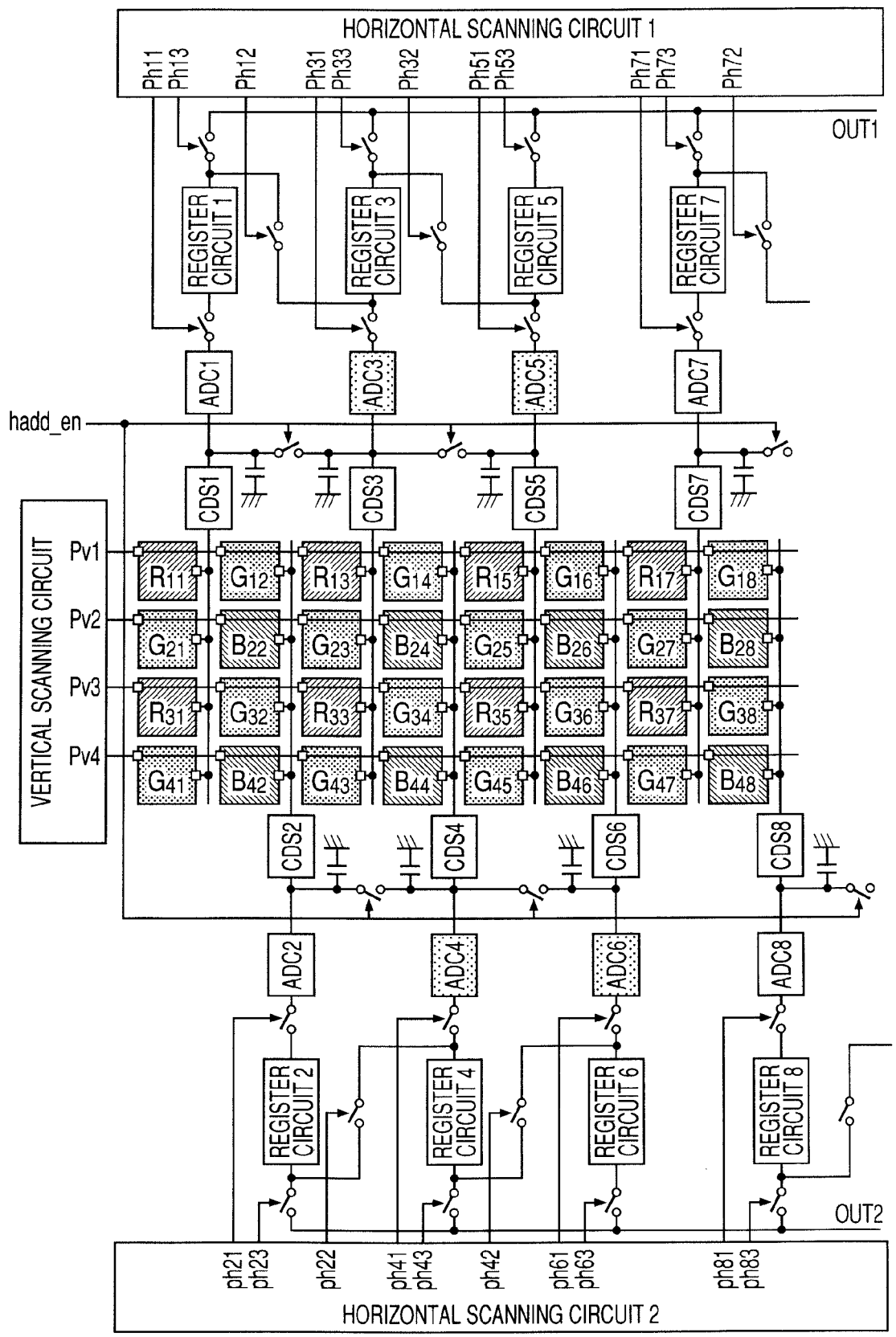
FIG. 4 is a block diagram of a solid-state imaging apparatus according to a second embodiment of the present invention.

FIG. 4 illustrates a schematic block diagram of a solid-state imaging apparatus according to Exemplary embodiment 2. The solid-state imaging apparatus has a holding capacitor provided therein so as to correspond to each column of pixels, and a connecting unit which connects the holding capacitors to each other provided therein, in addition to the structure illustrated in FIG. 1. Here, the solid-state imaging apparatus has a structure in which holding capacitors for adjacent 3 columns having the same color arrangement can be simultaneously connected. A switch which is provided as a connecting unit is controlled by a signal hadd_en to be input from a timing control circuit unit which is a control unit and will be described later. The solid-state imaging apparatus has such a structure that a signal in a column including an R pixel and a G pixel is output from OUT 1, and that a signal in a column including a G pixel and a B pixel is output from OUT 2. This structure shows the advantage of being capable of outputting a signal at a higher speed than that in Exemplary embodiment 1. In the present embodiment, when paying attention to the respective terminals OUT 1 and OUT 2, the respective terminals use one horizontal output line, which is different from Exemplary embodiment 1. According to this structure, such an effect can be expected that the number of the horizontal output lines can be reduced.

By the way, a pulse which is not involved in the operation and an electric wire relating thereto are omitted for the sake of simplifying the description, and the solid-state imaging apparatus in the present embodiment has a different relationship between each column selection signal and switch corresponding to the signal from that in FIG. 1. It is needless to say that the structure may have a register circuit as illustrated in FIG. 1.

A brief summary of the operation in the present exemplary embodiment will now be described below with reference to FIG. 5. Focusing on a first row as an example, the capacitances of holding capacitors corresponding to first, third and fifth columns of pixels are equal to each other, so the average values of pixels 11, 13, 15 which are pixels of the same color are stored in the holding capacitors in the upper side by connecting the holding capacitors in the first, third and fifth columns through switches. On the other hand, the average value of twelfth, fourteenth and sixteenth pixels which have color filters having the same colors arranged thereon is stored in the holding capacitors in the lower side by connecting holding capacitors in second, fourth and sixth columns through switches. Though being omitted in the figure, holding capacitors of seventh, ninth and eleventh columns, and eighth, tenth and twelfth columns are configured so as to be connected to each other. In the present exemplary embodiment, three columns capable of each being connected with a holding capacitor are treated as one block.

When three holding capacitors in each block are connected with each other through the switch, the 3 holding capacitors hold the same signal charge, so that a signal in any one of 3 columns may be subjected to A/D conversion. In the following description, the first column (ADC 1) is used, and the third and fifth columns (ADC 3 and ADC 5) are not used. For instance, the A/D converter may be set at a non-operating state in which the A/D converter does not carry out the A/D conversion operation, by turning off a power source for supplying an electric power to the A/D converter or by blocking the power source from the A/D converter. The power source may be controlled with the use of a timing control circuit which is a control unit and will be described later. Even columns similarly use the second column (ADC 2), but do not use the fourth and sixth columns (ADC 4 and ADC 6).

The operation will now be further described in detail below. In a period when a row selection signal 1 (Pv1) in the timing chart illustrated in FIG. 5 is set at a high level, in a solid-state imaging apparatus illustrated in FIG. 4, pixels in the first row are selected. Analog electric signals are read out from the selected pixels in the first row to holding capacitors of columns corresponding to the pixels in a horizontal blanking period which is shown in the status illustrated in FIG. 5, and the read-out analog electric signal is digitized by the A/D converter in an A/D conversion status. Here, a case is shown in which only the ADC 1 is used.

Figure 5:
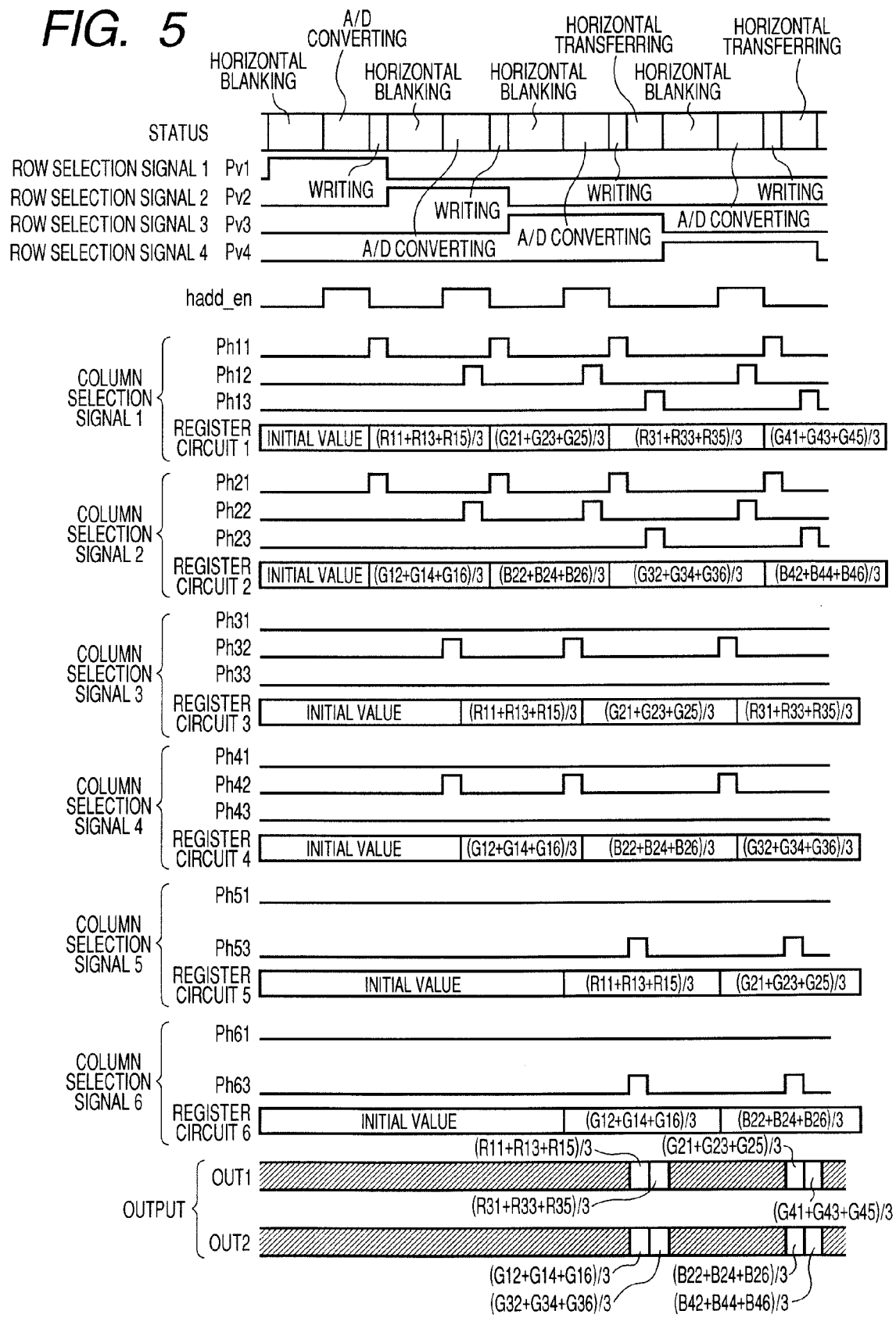
FIG. 5 is a timing chart illustrating a method for driving a solid-state imaging apparatus according to a second embodiment of the present invention.

The solid-state imaging apparatus writes the output of an A/D converter into a register circuit in a writing period shown in the status of FIG. 5, by closing (turning on) a switch which is provided in between the A/D converter and the register circuit. The solid-state imaging apparatus according to the present embodiment writes the output of the A/D converter based on pixels 11 into a register circuit 1, and the output of the A/D converter based on pixels 12 into a register circuit 2 respectively, by setting column selection signals Ph11 and Ph21 for controlling a switch at a high level. At this timing, a signal based on the pixels 11 in the first row is held in the register circuit 1, and a signal based on the pixels 12 is held in the register circuit 2, and a zero level is held in a register circuit other than the above register circuits. The zero level can use a signal obtained, for instance, by resetting pixels with an unshown resetting operation. The value held in the register circuit 1 at this time is expressed as (R11+R13+R15)/3.

A row selection horizontal blanking period in each row after a row selection period of a second row and subsequent rows, in which a row selection signal Pv2 is set at a high level, serves both as a period of reading out pixel signals in a selected row and a period of transferring pixel signals which have been held in the register circuit in the previous row to a register circuit of another column within the block. The period of transferring the pixel signals to the register circuit of another column will now be described below.

The period will be described while paying attention to the operation of a block corresponding to pixels in first, third and fifth columns for the sake of simplifying the description, but a similar operation is carried out on a block corresponding to pixels in second, fourth and sixth columns.

Firstly, in a horizontal blanking period, analog electric signals based on pixels in the second row are held in holding capacitors in respective columns.

Next, a signal Ph32 is set at a high level in an A/D conversion period, and thereby the data which has been held in a register circuit 3 is transferred to a register circuit 5. When a signal Ph12 is set at a high level, the data which has been held in the register circuit is transferred to the register circuit 3. In this period, a signal hadd_en is set at a high level, and thereby holding capacitors in first, third and fifth columns are connected to each other. Then, signal values held in three holding capacitors are averaged, and the average value is held in the respective holding capacitors. An A/D conversion is carried out based on the average value of the signals by an ADC 1. In the following writing status, a signal Ph11 is set at a high level, and the result of the A/D conversion is held in the register circuit 1. The value held in the register circuit 1 at this time is expressed as (G21+G23+G25)/3. The solid-state imaging apparatus according to the present exemplary embodiment firstly connects the output of the register circuit 3 with the input of the register circuit 5 by setting a column control signal Ph32 provided in a data bus at a high level to close a switch, and transfers the pixel signals held in the register circuit 3 to the register circuit 5. Next, the solid-state imaging apparatus sets a column control signal Ph12 at a high level, thereby closes a switch provided in a data bus to connect the output of the register circuit 1 with the input of the register circuit 3, and transfers pixel signals held in the register circuit 1 to the register circuit 3. By controlling the switches in the way described above, the pixel signals held in the register circuit 1 are transferred to the register circuit 3, and the pixel signals held in the register circuit 3 are transferred to the register circuit 5.

Figure 6:
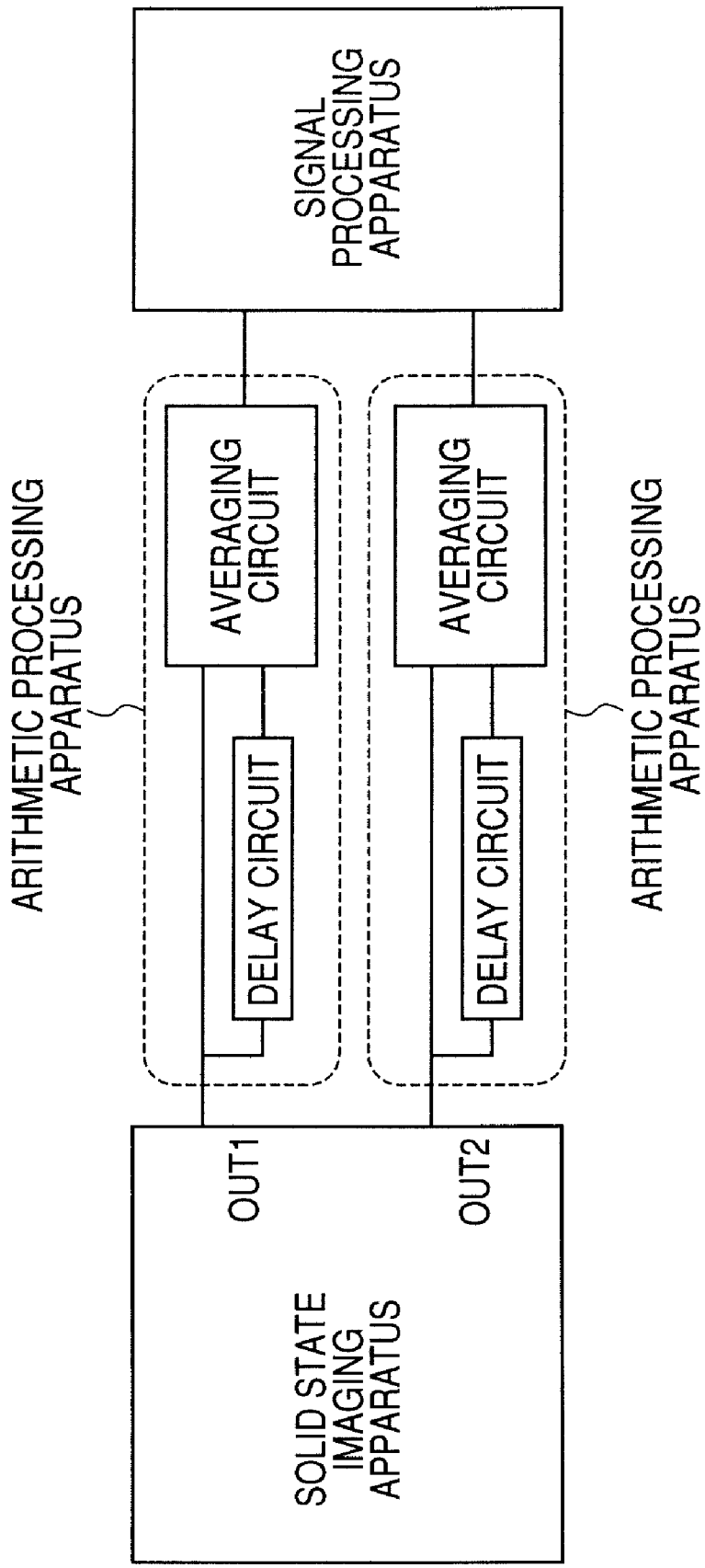
FIG. 6 is a schematic view of a structure including a solid-state imaging apparatus according to a second embodiment of the present invention.

In a period in which pixels in the third row are selected and a row selection signal Pv3 is set at a high level, the operations from a horizontal blanking period to a writing period are carried out similarly to those in the second row. At the time when a writing period in a period in which Pv3 is set at a high level has been finished, (R31+R33+R35)/3 is held in the register circuit 1, (G21+G23+G25)/3 is held in the register circuit 3, and (R11+R13+R15)/3 is held in the register circuit 5. In a horizontal transfer period which follows a writing period in the third row, a signal is set at a high level in the order of Ph53 and Ph13, and digital signals based on R pixels in the first row and the third row are output from OUT 1. Digital signals according to the first row in this way are input into an averaging circuit through a delay circuit as illustrated in FIG. 6, and digital signals according to the third row are input into an averaging circuit. The delay circuit makes a transmission of the signal delay by one row, so that averaging processing is carried out on digital signals according to the first row and third row in the averaging circuit. Here, the delay circuit and the averaging circuit correspond to an arithmetic operation circuit illustrated in FIG. 1. The reason why such an arithmetic operation circuit is employed is because the solid-state imaging apparatus according to the present exemplary embodiment outputs the signals from register circuits through each one horizontal output line connecting to OUT 1 and OUT 2, which is different from that in Exemplary embodiment 1.

In the horizontal transfer period of a period in which a row selection signal Pv4 is set at a high level, digital signals according to G pixels in the second row and fourth row are output, and are subjected to averaging processing in the averaging circuit, similarly to that for R pixels.

As was described above, the solid-state imaging apparatus according to the present exemplary embodiment can achieve the averaging processing of signals based on a plurality of pixels in a horizontal direction and signals based on a plurality of pixels in a vertical direction, while preventing the circuit size from increasing.

(Exemplary Embodiment 3)

A third exemplary embodiment according to the present invention will now be described below. Here, a point different from that in Exemplary embodiment 2 will be mainly described below, and the same point as that in Exemplary embodiment 2 will be omitted. In the present exemplary embodiment as well, signals which are not involved in the operation and electric wires relating to the signals are omitted, but it is not needless to say that the solid-state imaging apparatus in the present exemplary embodiment may have a structure as illustrated in FIG. 1. In the present exemplary embodiment, a relationship between each column selection signal and a switch corresponding to the column selection signal is different from that in FIG. 1 and FIG. 4.

In Exemplary embodiment 2, the output of an A/D converter was input into a register circuit in a column corresponding to the A/D converter, and besides, the digital signal which had been held in the register circuit was input into a register circuit of another column. On the other hand, in the present exemplary embodiment, a digital signal is input not only into a column corresponding to the A/D converter as the output of the A/D converter, but also into register circuits in other columns than that corresponding to the A/D converter.

Figure 7:
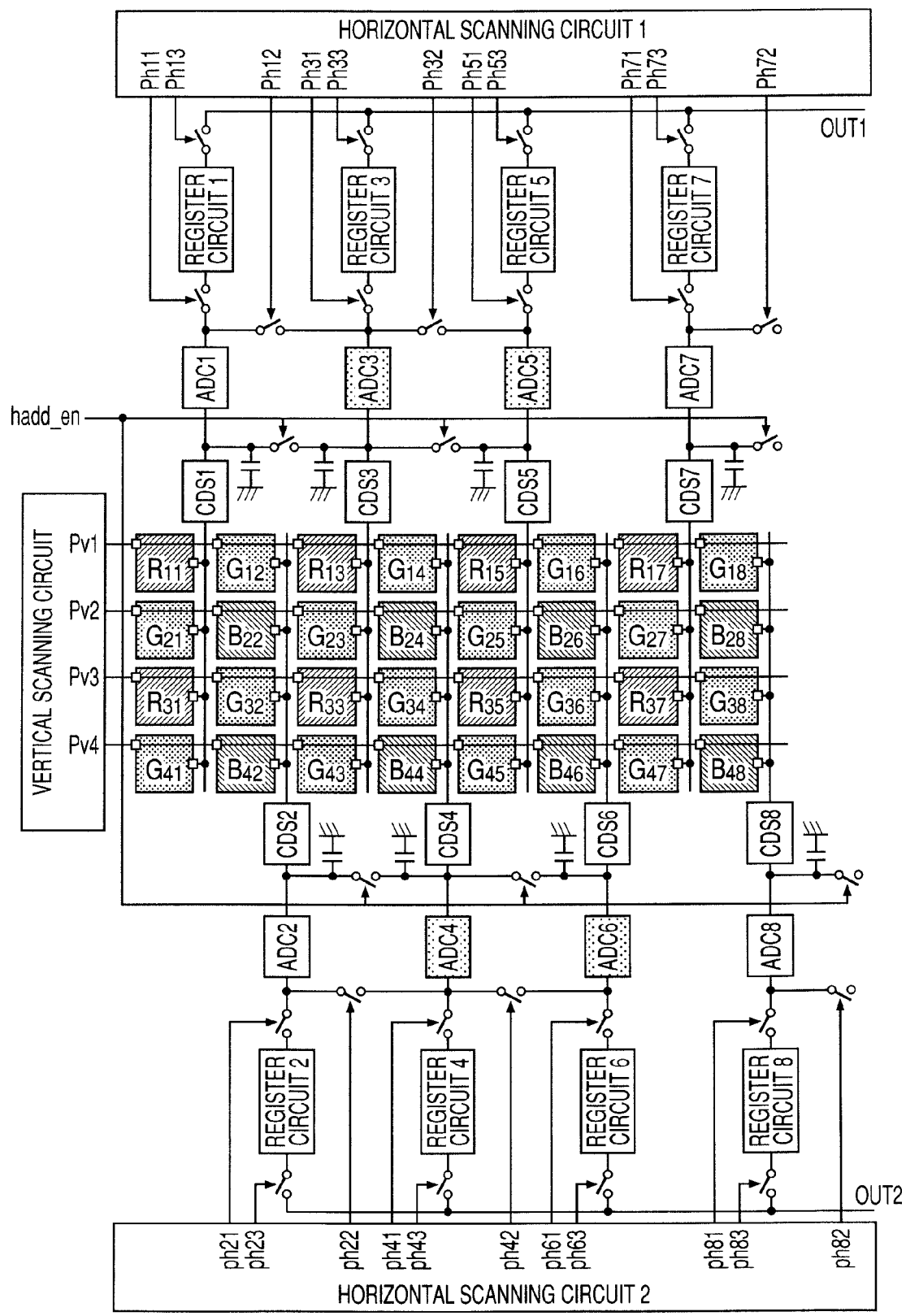
FIG. 7 is a block diagram of a solid-state imaging apparatus according to a third embodiment of the present invention.

FIG. 7 is a block diagram illustrating a schematic structure of a solid-state imaging apparatus according to the present exemplary embodiment, and illustrates only electric wires to be used in the present exemplary embodiment among the electric wires illustrated in FIG. 1. The operation according to the present exemplary embodiment will now be described in detail below with reference to a timing chart in FIG. 8.

Figure 8:
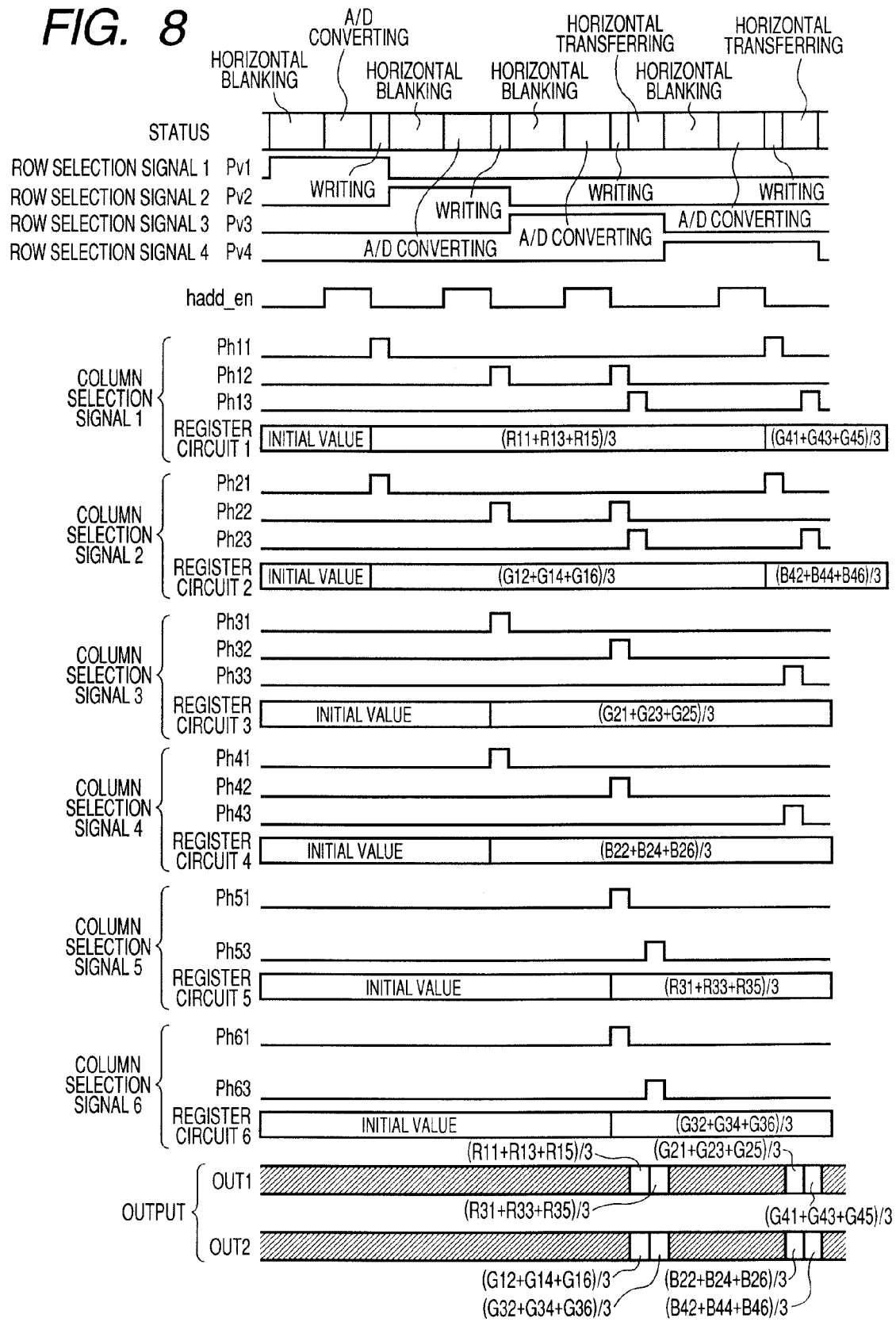
FIG. 8 is a timing chart illustrating a method for driving a solid-state imaging apparatus according to a third embodiment of the present invention.

The operation in a period in which the row selection signal Pv1 is set at a high level is the same as in Exemplary embodiment 2. In a writing period of a period in which the row selection signal Pv1 is set at a high level, a digital signal corresponding to the average value of the signals based on pixels in R11, R13 and R15 is written into the register circuit 1. In FIG. 8, the average value is expressed as (R11+R13+R15)/3.

In a period in which a row selection signal Pv2 is set at a high level, signals in each of pixels G21, G23 and G25 are held in holding capacitors corresponding to each of the pixels in a horizontal blanking period. A signal hadd_en is set at a high level in an A/D conversion period following the horizontal blanking period, and then, an ADC 1 converts the average value of the signals based on pixels of G21, G23 and G25 into a digital value. Furthermore, in a writing period, the signals Ph12 and Ph31 are set at a high level, and the output of the ADC 1 is thereby input into the register circuit 3 in a column which is different from that of the ADC 1. Specifically, a digital signal corresponding to the average value of the signals based on the pixels of G21, G23 and G25 is written into the register circuit 3. In FIG. 8, the value is expressed as (G21+G23+G25)/3.

In a period in which a row selection signal Pv3 is set at a high level, signals of each of pixels of R31, R33 and R35 are held in a holding capacitor corresponding to each of the pixels, in a horizontal blanking period. In an A/D conversion period following the horizontal blanking period, a signal hadd_en is set at a high level, and then, an ADC 1 converts the average value of the signals based on the pixels of R31, R33 and R35 to a digital signal. Furthermore, in a writing period, the signals Ph12, Ph32 and Ph51 are set at a high level, and the output of the ADC 1 is thereby input into a register circuit 5 in a column which is different from that of the ADC 1. In other words, a digital signal corresponding to the average value of the signals based on the pixels of R31, R33 and R35 is written into the register circuit 5. In FIG. 8, the average value is expressed as (R31+R33+R35)/3. In a horizontal transfer period in which the row selection signal Pv3 is set at a high level, Ph13 and Ph53 are sequentially set at a high level, and signals are output from OUT 1. Here, the signal which has been output from the OUT 1 is averaged by an arithmetic processing circuit shown in FIG. 6. Thereby, the average value of signals based on 6 pixels of R11, R13, R15, R31, R33 and R35 can be obtained.

In a period in which a row selection signal Pv4 is set at a high level, an operation similar to that in a period in which the row selection signal Pv3 is set at a high level is carried out. At this time, the average value of signals based on 6 pixels of G21, G23, G25, G41, G43 and G45 can be obtained.

The solid-state imaging apparatus according to the present exemplary embodiment has the advantage that the operation can be simplified because the operation for transferring signals in a certain register circuit to a register circuit of another column becomes unnecessary.

(Exemplary Embodiment 4)

Figure 10:
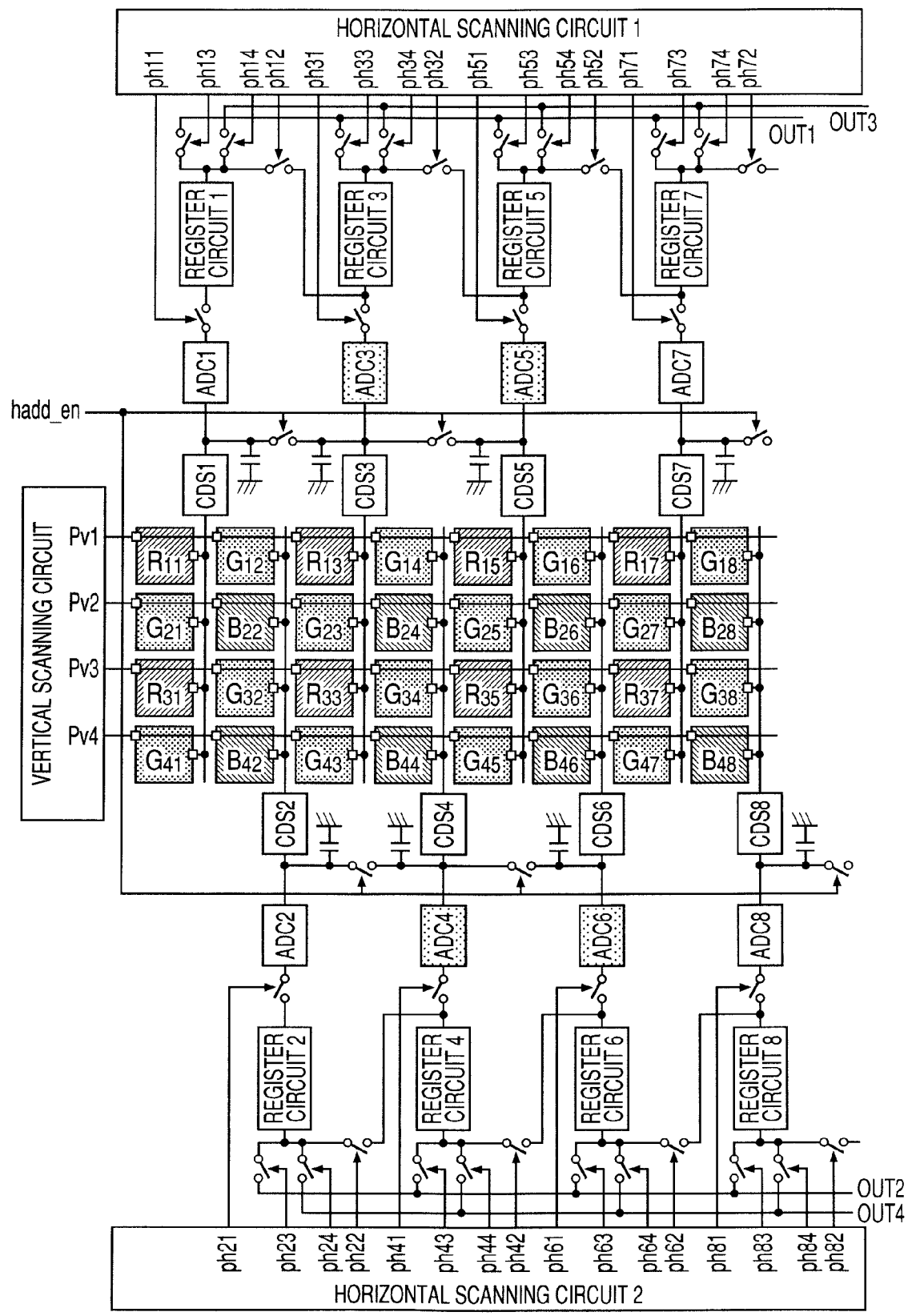
FIG. 10 is a block diagram of a solid-state imaging apparatus according to a fourth embodiment of the present invention.

Next, another exemplary embodiment according to the present invention will now be described below with reference to FIG. 10. The exemplary embodiment will be described mainly on a point which is different from that in Exemplary embodiment 2.

A solid-state imaging apparatus according to the present exemplary embodiment has such a structure that each register circuit can be connected with two horizontal output lines, similarly to that in Exemplary embodiment 1. Though being omitted in the figure, OUT 1 and OUT 3 are connected to an arithmetic operation circuit in parallel, similarly to the two horizontal output lines shown in FIG. 1. Furthermore, any one of OUT 1 and OUT 3 may be branched and be connected to a selector, similarly to that in FIG. 1. Similarly, OUT 2 and OUT 4 are connected with an unshown arithmetic operation circuit in parallel. Any one of OUT 2 and OUT 4 may be branched and connected to the selector.

Figure 11:
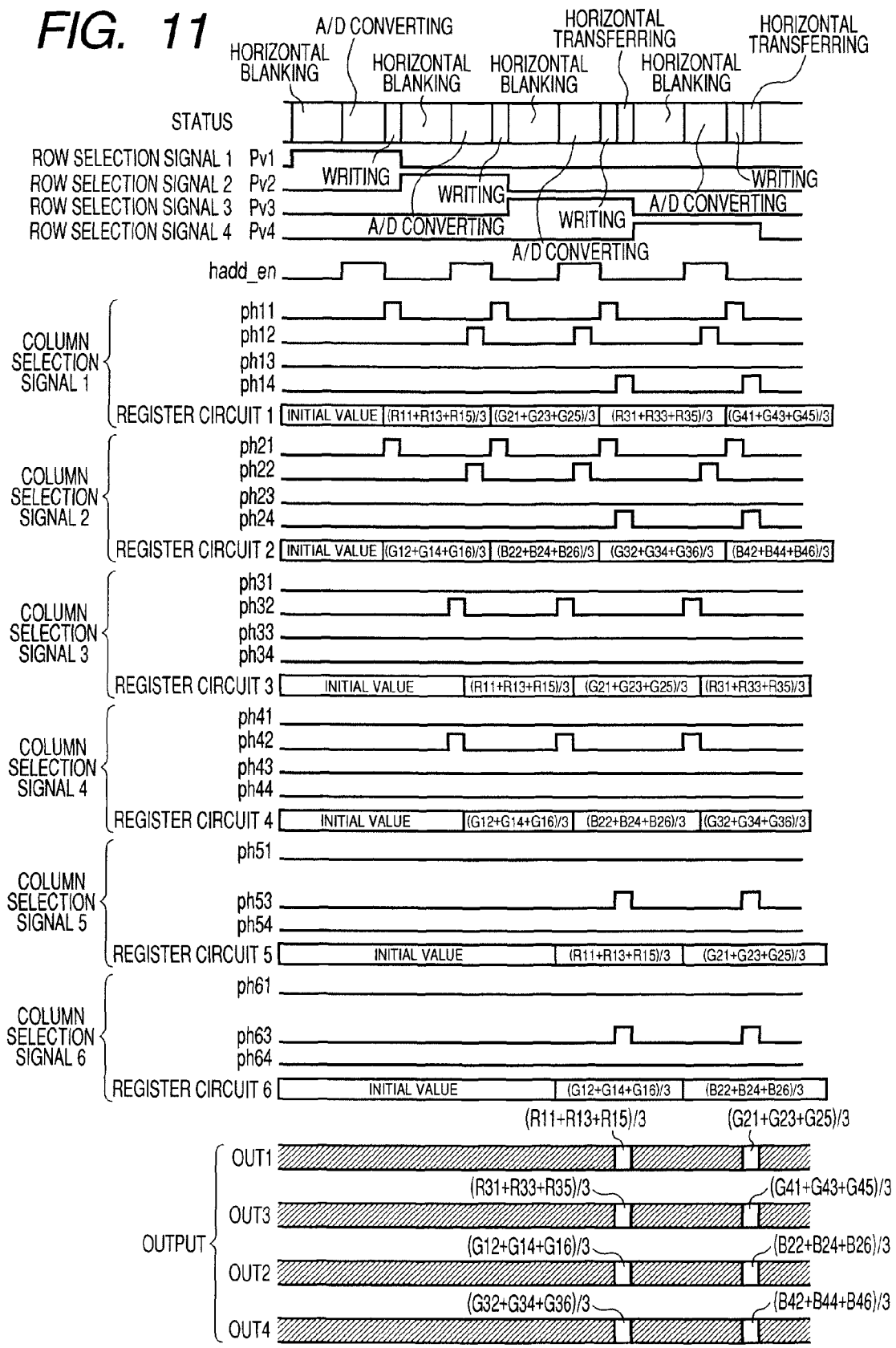
FIG. 11 is a timing chart illustrating a method for driving a solid-state imaging apparatus according to a fourth embodiment of the present invention.

Next, the operation according to the present exemplary embodiment will now be described below with reference to FIG. 11. The operation will be described focusing on a block relating to ADC 1, ADC 3 and ADC 5, according to Exemplary embodiments 2 and 3. Suppose that an initial value is stored in each register circuit. The initial value is arbitrarily determined. However, suppose that the initial value is zero here.

Firstly, in a horizontal blanking period of a period in which a row selection signal Pv1 is set at a high level, analog electric signals based on R11, R13 and R15 are held in holding capacitors through CDS circuits in respectively corresponding columns.

In an A/D conversion period following the horizontal blanking period, a signal hadd_en is set at a high level. Then, the capacitors for holding the analog electric signals based on R11, R13 and R15 are electrically connected to each other. The holding capacitors in a block have the equal capacitance to each other, so that when the holding capacitors are connecting to each other by a switch, the average level of analog electric signals based on pixels of R11, R13 and R15 is held in these holding capacitors.

In a writing period following the A/D conversion period, an A/D conversion operation is carried out based on the previous average level held in the holding capacitors. In this period, when a column selection signal Ph11 is set at a high level, the result converted by the ADC 1 is stored in a register circuit 1. At this time, the result is stored in the register circuit 1. The average level of the signals based on R11, R13 and R15 is expressed as (R11+R13+R15)/3.

Subsequently, in a horizontal blanking period of a period in which a row selection signal Pv2 is set at a high level after the row selection signal Pv1 is set to a low level, pixels relating to pixels in a second row are selected. In this block, analog electric signals based on pixels of G21, G23 and G25 are held in holding capacitors of columns corresponding to respective pixels through CDS circuits.

In the following A/D conversion period, a column selection signal Ph32 is firstly set at a high level. Thereby, a digital signal held in a register circuit 3 is transferred to a register circuit 5. The register circuits 3 and 5 were set so as to hold the initial value, so that a digital signal held in the register circuit 5 is kept at the initial value. Subsequently, a column selection signal Ph12 is set at a high level, and (R11+R13+R15)/3 which has been held in the register circuit 1 results in being stored in the register circuit 3. In parallel with this operation, a signal hadd_en is set at a high level in the A/D conversion period. Thereby, three holding capacitors are electrically connected to each other, and the average level of analog electric signals based on the pixels of G21, G23 and G25 is held in the holding capacitors. Furthermore, an A/D conversion operation is carried out based on the average level.

In a writing period following the A/D conversion period, the column selection signal Ph11 is set at a high level, and (G21+G23+G25)/3 which is the average level of signals based on G21, G23 and G25 is written into the register circuit 1.

Subsequently, in a horizontal blanking period of a period in which a row selection signal Pv3 is set at a high level in place of the row selection signal Pv2, pixels relating to pixels in a third row are selected. In this block, analog electric signals based on pixels of R31, R33 and R35 are held in holding capacitors of columns corresponding to respective pixels through CDS circuits.

In the following A/D conversion period, a column selection signal Ph32 is firstly set at a high level. Thereby, a digital signal held in the register circuit 3 is transferred to the register circuit 5. In other words, (R11+R13+R15)/3 which has been held in the register circuit 3 is written into the register circuit 5. Subsequently, the column selection signal Ph12 is set at a high level, and (G21+G23+G25)/3 which has been held in the register circuit 1 results in being stored in the register circuit 3. In parallel with this operation, the signal hadd_en is set at a high level in the A/D conversion period. Thereby, three holding capacitors are electrically connected to each other, and the average level of analog electric signals based on the pixels of R31, R33 and R35 is held in the holding capacitors. Furthermore, an A/D conversion operation is carried out based on this average level.

In a writing period following the A/D conversion period, the column selection signal Ph11 is set at a high level, and (R31+R33+R35)/3 which is the average level of signals based on R31, R33 and R35 is written into the register circuit 1.

The operation described above is the same operation as in Exemplary embodiment 2, but the operation in a horizontal transfer period is different from that in Exemplary embodiment 2. Each register circuit in a solid-state imaging apparatus according to the present exemplary embodiment has such a structure so as to be capable of being connected with two horizontal output lines, so that signals held in the register circuits 1 and 5 can be simultaneously output through respective other horizontal output lines, for instance. Specifically, column selection signals Ph14 and Ph53 are simultaneously set at a high level, (R31+R33+R35)/3 which has been held in the register circuit 1 is output through an OUT 3, and (R11+R13+R15)/3 which has been held in the register circuit 5 is output through OUT 1. Then, the signals are subjected to averaging processing in an unshown arithmetic operation circuit. Thereby, the average level based on 6 R pixels can be obtained.

Even in a period in which a row selection signal Pv4 is set at a high level, the same operation as in a period in which the row selection signal Pv3 is set at a high level is carried out, and the average level based on 6 G pixels can be obtained this time.

As was described above, the OUT 1 and the OUT 3 are connected to the arithmetic operation circuit in parallel as was described in Exemplary embodiment 1, so that a delay circuit needs not to be installed as is shown in Exemplary embodiment 2. In other words, a structure according to the present exemplary embodiment has advantage in being capable of shortening a horizontal transfer period, and can output a signal at a higher speed.

In the above description, the operation was described while taking a block corresponding to pixels in a first, third and fifth columns from the left side as an example, but the same operation is carried out in other blocks as well. In addition, each block employs only one A/D converter, so that an A/D converter which does not participate in the operation may be set at a non-operating state in which the A/D converter does not carry out an A/D conversion operation, by turning off a power source for supplying the A/D converter or blocking the A/D converter from the power source. The A/D converter in the non-operating state is shown by a half-tone dotted area in FIG. 10.

By the way, in the present exemplary embodiment, operations in the horizontal blanking period and in the A/D conversion period are determined to be the same as operations in Exemplary embodiment 2, but may be the same as operations in Exemplary embodiment 3. Even in that case, the operation is advantageous in increasing the outputting speed from the above described reason.

(Exemplary Embodiment 5)

Figure 9:
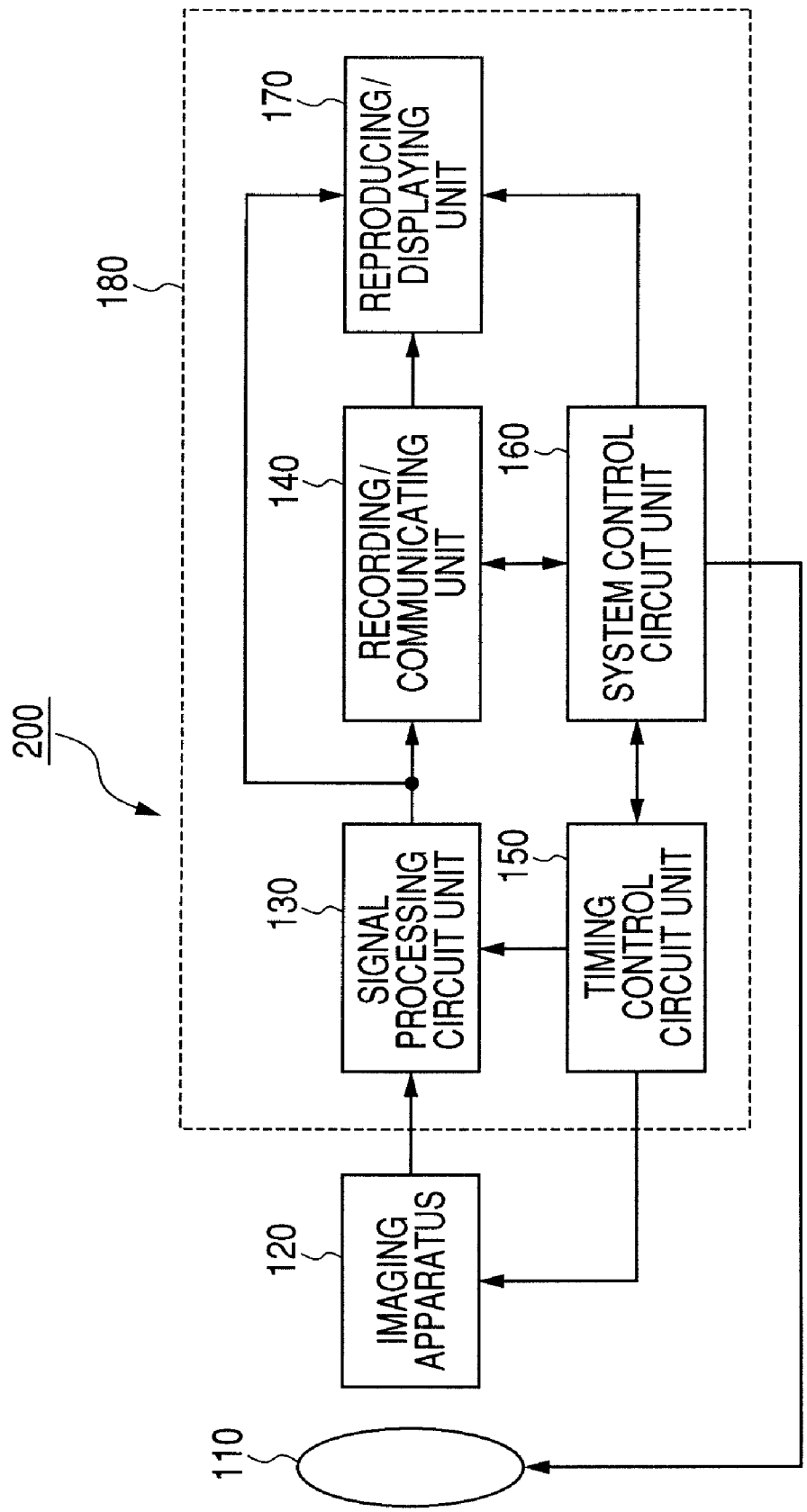
FIG. 9 is a block diagram of an imaging system according to a fifth embodiment of the present invention.

A schematic structure and a brief summary of an operation of an imaging system 200 according to Exemplary embodiment 5 of the present invention will now be described with reference to FIG. 9. FIG. 9 is a block diagram of the imaging system 200 according to the present exemplary embodiment.

The imaging system 200 has an optical system 110, a solid-state imaging apparatus 120 and a signal processing section 180. The signal processing section 180 includes a signal processing circuit unit 130, a recording/communicating unit 140, a timing control circuit unit 150, a system control circuit unit 160 and a reproducing/displaying unit 170.

The optical system 110 forms an image of an object on pixel array which is an imaging area of the solid-state imaging apparatus 120.

The solid-state imaging apparatus 120 is, for instance, a solid-state imaging apparatus according to Exemplary embodiment 1. The solid-state imaging apparatus 120 converts the image of the object formed in the arranged pixels to an image signal. The solid-state imaging apparatus 120 reads out the image signal from the arranged pixels, and outputs the image signal to the signal processing circuit unit 130.

The signal processing circuit unit 130 subjects the image signal which has been supplied from the solid-state imaging apparatus 120 to signal processing, for instance, such as compression processing of image data, according to a previously determined method. The signal processing circuit unit 130 supplies the image data which has been subjected to the signal processing to the recording/communicating unit 140 and the reproducing/displaying unit 170.

The recording/communicating unit 140 records the image data which has been supplied from the signal processing circuit unit 130 in an unshown recording medium, or sends the image data to a similarly unshown exterior apparatus. Alternatively, the recording/communicating unit 140 reads out the image data from a recording medium and supplies the image data to the reproducing/displaying unit 170, or receives a predetermined direction from an unshown input section, and supplies the predetermined direction to a system control circuit unit 160.

The reproducing/displaying unit 170 makes a display device display the image data which has been supplied from the signal processing circuit unit 130 or the recording/communicating unit 140 thereon.

The timing control circuit unit 150 supplies a signal for controlling a timing of driving the solid-state imaging apparatus 120, and accordingly has a role as a mode-switching unit. For instance, the timing control circuit unit 150 supplies a signal for driving the solid-state imaging apparatus 120 in a mode of carrying out a horizontal skipping operation, or supplies a signal for driving the solid-state imaging apparatus 120 in a mode of reading out signals of all pixels.

The system control circuit unit 160 receives information on a predetermined direction from the recording/communicating unit 140. The system control circuit unit 160 controls the optical system 110, the recording/communicating unit 140, the reproducing/displaying unit 170 and the timing control circuit unit 150 according to the predetermined direction. The system control circuit unit 160 controls the optical system 110, the recording/communicating unit 140, the reproducing/displaying unit 170 and the timing control circuit unit 150, according to respective modes such as a mode of all-pixels reading and a mode of skipping reading, for instance.

The imaging system 200 according to the present exemplary embodiment can hold a digital signal in a register circuit provided in a column of pixels of which the signal is not read out, in a skipping operation. Thereby, the imaging system 200 can reduce the number of a register circuit which does not participate in the operation when a horizontal skipping operation is carried out, and can achieve arithmetic processing such as addition, averaging, subtraction (difference) while enhancing the use efficiency of the circuit.

In any of the above described exemplary embodiments, a structure has been described in which an arithmetic operation circuit 109 and a selector 110 are included in the inner part of a solid-state imaging apparatus, but the arithmetic operation circuit 109 and the selector 110 do not necessarily need to be provided in the inner part of a solid-state imaging apparatus 120. The arithmetic operation circuit 109 and the selector 110 may be provided, for instance, in a signal processing circuit unit in FIG. 9. In this case, the area in the semiconductor substrate of the solid-state imaging apparatus 120 can be reduced, and still, the above described effect can be obtained. It is important in the present invention that the solid-state imaging apparatus has a structure in which a digital signal can be held in a register circuit provided in a column of pixels in which the signal is not read out, in the horizontal skipping operation.

In each of the above described exemplary embodiments, the solid-state imaging apparatus selects pixels of every other pixel, and adds the signals based on the pixels, but may select pixels of every 3 pixels or every 5 pixels, for instance. The method may be appropriately changed according to the application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2008-091555, filed Mar. 31, 2008, which is hereby incorporated by reference herein in its entirety.

What is claimed is:

1. A solid-state imaging apparatus comprising:
    a plurality of pixels arranged in a matrix, wherein each of the pixels converts an incident light into an analog electric signal, and outputs the analog electric signal;
    A/D converters arranged each corresponding to one column of the plurality of pixels, for converting the analog electric signal from the pixel into a digital signal and for outputting the digital signal from an output terminal of the A/D converter;
    register circuits each arranged corresponding to one column of the plurality of pixels, for receiving by an input terminal thereof the digital signal output from the output terminal of the A/D converter, and for holding the digital signal received;
    a connecting unit for selectively effecting connection of the output terminal of the A/D converter arranged correspondingly to one column of the pixels to the input terminal of the register circuit arranged correspondingly to another column of the pixels, and connection of the output terminal of the register circuit arranged correspondingly to the one column of the pixels to the input terminal of the register circuit arranged correspondingly to the other column of the pixels; and
    color filters, each arranged correspondingly to one of the pixels.

2. The solid-state imaging apparatus according to claim 1, further comprising
    an arithmetic processing unit for effecting an arithmetic processing of the digital signal output from each of the output terminals of the plurality of register circuits and for outputting the processed digital signal.

3. The solid-state imaging apparatus according to claim 2, wherein
    the arithmetic processing includes at least one of addition and averaging.

4. The solid-state imaging apparatus according to claim 2, wherein
    the arithmetic processing unit effects the arithmetic processing of the digital signal based on the analog electric signal from the pixels in the same column on which the color filters of the same color are arranged.

5. The solid-state imaging apparatus according to claim 1, further comprising
    holding capacitors for holding the analog electric signal each arranged for one column of the pixels;
    a switch for connecting the holding capacitors arranged correspondingly to different columns; and
    a control unit for turning on the switch after the holding capacitor holds the analog electric signal from the pixels arranged along the same row on which the color filters of the same color are arranged.

6. The solid-state imaging apparatus according to claim 5, wherein
    the control unit controls to convert by the A/D converter the analog electric signal held by the holding capacitor after turning on the switch, and to hold the digital signal by the register circuit.

7. The solid-state imaging apparatus according to claim 6, wherein
    the control unit controls to set non-operating state all of the A/D converters except for one arranged correspondingly to the plurality of holding capacitors connected by the switch.

8. The solid-state imaging apparatus according to claim 5, wherein
    the control unit controls to set non-operating state all of the A/D converters except for one arranged correspondingly to the plurality of holding capacitors connected by the switch.

9. A driving method of a solid-state imaging apparatus according to claim 1, wherein the method comprises a step of transferring the digital signal held by one of the register circuits to another of the register circuits.

10. A driving method of a solid-state imaging apparatus according to claim 1, wherein the method comprises a step of holding the digital signal output from one of the A/D converters by the register circuit arranged correspondingly to a column of the pixels different from a column of the pixels to which the one A/D converter corresponds.

* * * * *